(12) United States Patent
Wang (10) Patent No.: US 8,671,829 B2
(45) Date of Patent: Mar. 18, 2014

(54) STRUCTURE OF BREWING DEVICE

(76) Inventor: Lung-Mi Wang, New Taipei (TW)

( * ) Notice: Subject to any disclaimer, the term of this patent is extended or adjusted under 35 U.S.C. 154(b) by 411 days.

(21) Appl. No.: 13/032,643

(22) Filed: Feb. 23, 2011

(65) Prior Publication Data

US 2012/0210881 A1 Aug. 23, 2012

(51) Int. Cl.
*A47J 31/00* (2006.01)

(52) U.S. Cl.
USPC ............................. 99/302 P; 99/279; 99/323.3

(58) Field of Classification Search
USPC .............. 99/279, 297, 302 P, 323.3; 426/433; 73/1.05, 1.19, 1.68, 114.28, 861.54, 73/239, 248, 250, 258, 261, 864.13, 73/864.16
See application file for complete search history.

(56) References Cited

U.S. PATENT DOCUMENTS

| | | | |
|---|---|---|---|
| 6,324,966 B1 * | 12/2001 | Joergensen | 99/297 |
| 6,711,988 B1 * | 3/2004 | Eugster | 99/299 |
| 2005/0172818 A1 * | 8/2005 | Hunt et al. | 99/279 |
| 2012/0121780 A1 * | 5/2012 | Lai et al. | 426/433 |

* cited by examiner

*Primary Examiner* — Jianying Atkisson
(74) *Attorney, Agent, or Firm* — Leong C. Lei (57) ABSTRACT

A brewing device includes a brewing cylinder and a piston received in and reciprocally movable inside the brewing cylinder. The brewing device is connected to a water supply device that supplies a liquid to the brewing cylinder. The piston includes a piston head that is hollow and includes a bar mounted to an inside wall thereof and a piston rod that forms a pivot hole rotatably jointed to the bar to allow the bar to do movement. The piston rod forms a lid at a location close to the pivot hole that selectively sets the piston in a closed condition, whereby through change of position of the lid by the piston rod, the piston is switchably set in an open configuration and a closed configuration for readily controlling amount of water contained in the brewing cylinder to meet various conditions for different quantities of brewing water.

10 Claims, 8 Drawing Sheets

STRUCTURE OF BREWING DEVICE

TECHNICAL FIELD OF THE INVENTION

The present invention generally relates to a brewing device, and more particularly to a structure of brewing device that realizes precise control of water discharge from a brewing cylinder through reciprocal movement of a piston with water of any temperature.

DESCRIPTION OF THE PRIOR ART

Coffee is a common beverage for modern people, which is not considered just a refreshing drink, but also a beverage for enjoying a relaxed moment in a busy life. The increasing demand for sophisticated tastes in modern life results in ever higher expectations for the taste of coffee. Due to such a trend, the brewing structure of a coffee making machine becomes vital, especially for preserving the original flavor of coffee beans.

Generally, a pressure steam coffer making machine comprises a brewing device that is composed of a brewing cylinder and a piston. However, the conventional brewing device is not of a design that is precise in controlling water supply. Thus, when the coffee making machine is supplying water to the brewing cylinder, the piston must be operated by steam pressure to move upward in order to allow water to enter the brewing cylinder. Since the water steam used to brew coffee is of a temperature between 103-105° C., the taste of coffee so brewed is often damaged, impairing the value of the coffee.

SUMMARY OF THE INVENTION

A primary objective of the present invention is to realize ready control of water discharge from a brewing cylinder through switching a piston between a closed configuration and an open configuration due to change of position of a piston rod so as to meet any desired conditions for any desired quantity of brewing water.

To achieve the above objective, the present invention provides a brewing device, which comprises a brewing cylinder and a piston. The piston is received in and reciprocally movable inside the brewing cylinder. The brewing device is connected to a water supply device that supplies a liquid to the brewing cylinder. The piston comprises a piston head and a piston rod. The piston head is of a hollow form and comprises a bar mounted to an inside wall of the piston head. The piston rod forms a pivot hole that is rotatably jointed to the bar in such a way to allow the bar to move. The piston rod forms a lid at a location close to the pivot hole that selectively sets the piston in a closed condition, whereby through change of position of the lid by the piston rod, the piston is switchably set in an open configuration and a closed configuration for readily controlling the amount of water contained in the brewing cylinder to meet various conditions for any desired quantity of brewing water.

A secondary objective of the present invention is to realize a reduced overall size in order to facilitate easy carrying and convenient use in any location.

A further objective of the present invention is that no consumption of electrical power is needed so as to comply with the trends of environmental conservation, energy saving, and safety.

A yet further objective of the present invention is for use with both cold brewing and hot brewing.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described, embodiments may be made in the function and arrangement of the elements described without departing from the scope of the invention as set forth in the appended claims.

Figure 1:
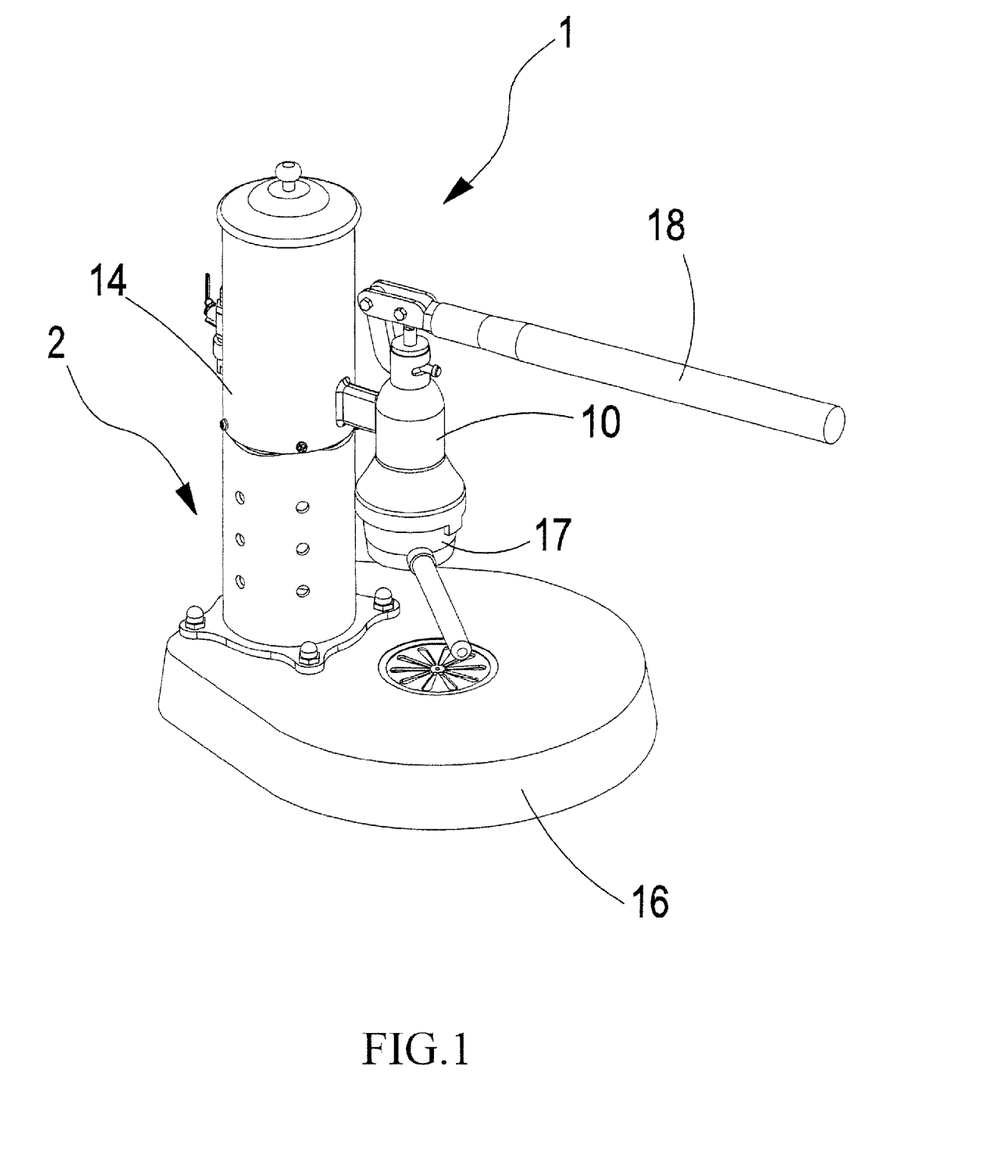
FIG. 1 is a perspective view showing a preferred embodiment according to the present invention.
Figure 2:
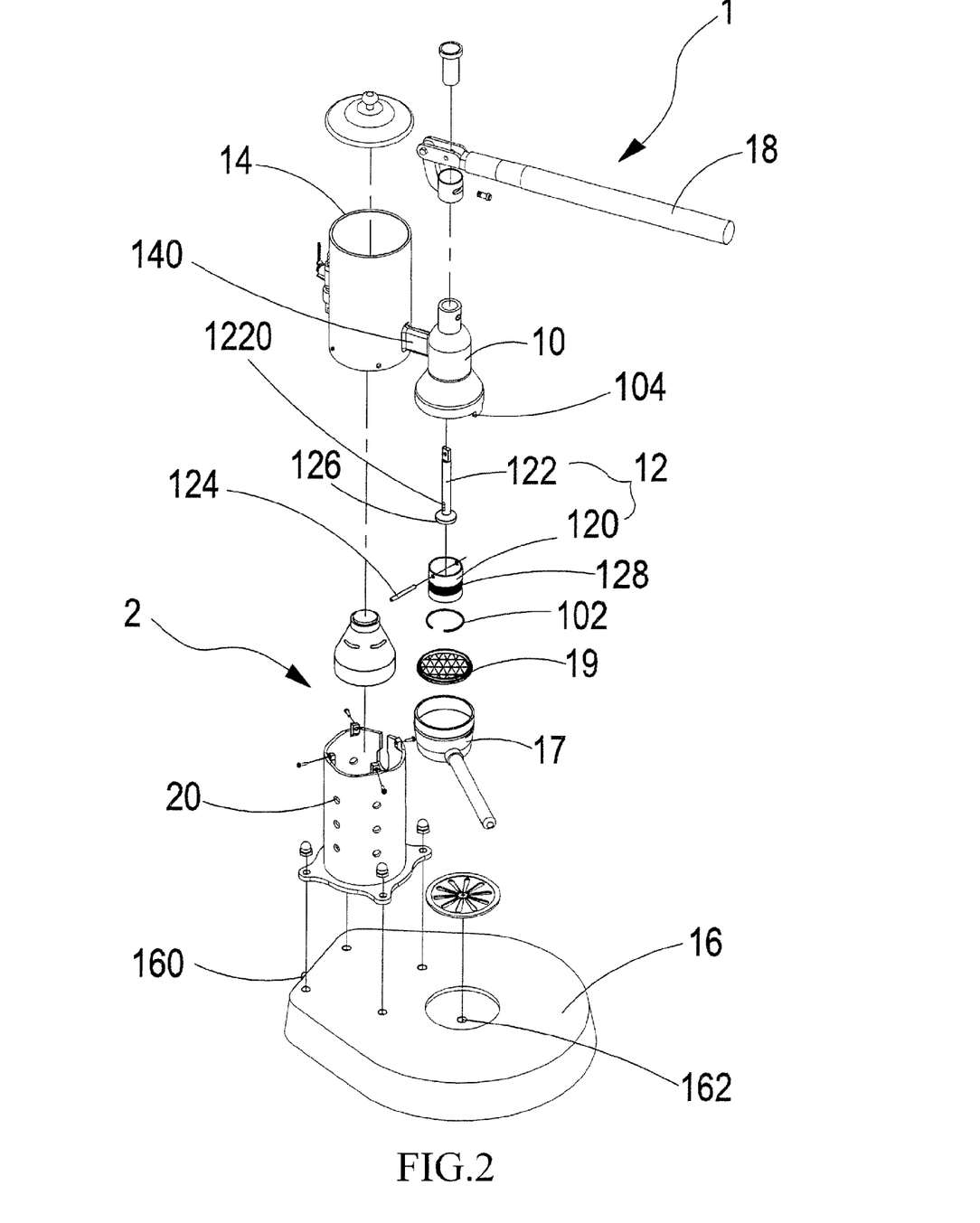
FIG. 2 is an exploded view showing the preferred embodiment according to the present invention.

Referring to FIGS. 1 and 2, which are respectively a perspective view and an exploded view showing a preferred embodiment according to the present invention, the drawings clearly show a structure of brewing device according to the present invention, the brewing device 1 of the present invention comprises a brewing cylinder 10 and a piston 12. The piston 12 is received in the brewing cylinder 10 and is reciprocally movable. The brewing device 1 is connected to water supply device 14 that supplies a liquid to the brewing cylinder 10. The water supply device 14 comprises a connection portion 140 extending therefrom and connected to the brewing cylinder 10 for conveyance of water. Further, the brewing device 1 is positionable on a base 16, and the base 16 forms a drainage hole 162 that is connected to a water drain pipe 160. The piston 12 comprises a piston head 120 and a piston rod 122. The piston head 120 is of a hollow form, and comprises a bar 124 mounted to an inside wall of the piston head 120. The piston rod 122 forms a pivot hole 1220 that is rotatably jointed to the bar 124 in such a manner to allow the bar 124 to translate with respect to the piston rod 122. The piston rod 122 forms a lid 126 at a location close to the pivot hole 1220 that selectively sets the piston 12 in a closed configuration. Through change of the position of the lid 126 by the piston rod 122, the piston 12 is switchably set in an open configuration or a closed configuration. When the lid 126 is raised by the piston rod 122, a hole 1201 at the bottom of the piston head 120 is opened and the piston 12 is switched to an open configuration, wherein water contained in the brewing cylinder 10 is allowed to flow through the spacing formed due to the detachment of the lid 126 from the piston 12 into a carriage container 17 for making coffee. Through the spacing selectively formed between the lid 126 and the piston 12, the piston rod 122 can be used to control the amount of water discharged. The piston rod 122 is extended to form a depression handle 18 and is controlled by the handle so as to facilitate a user's operation, whereby through operation of the depression handle 18, the piston head 120 is caused to do reciprocal movement.

The brewing cylinder 10 is provided on an inside wall thereof with a clamp ring 102, and the piston head 120 is provided on an outer wall thereof with a resilient collar 128 that engages the clamp ring 102, whereby with the engagement between the clamp ring 102 and the resilient collar 128, undesired detachment of the piston head 120 can be prevented, and isolation prevention of spillage of liquid can be realized. Further, the brewing cylinder 10 is provided therein with a filter device 19 that prevents reversal movement of coffee powders. The brewing cylinder 10 forms a plurality of retention projections 104 at the bottom thereof at a location adjacent to the filter device 19. The retention projections 104 function to secure and position the carriage container 17 that receives and holds therein coffee powders.

Further, the water supply device 14 is provided with a heating device 2, which heats and thus raises the temperature of the water supply device 14. The heating device 2 forms a plurality of air passages 20 for sufficient supply of air for combustion in heating.

Figure 3:
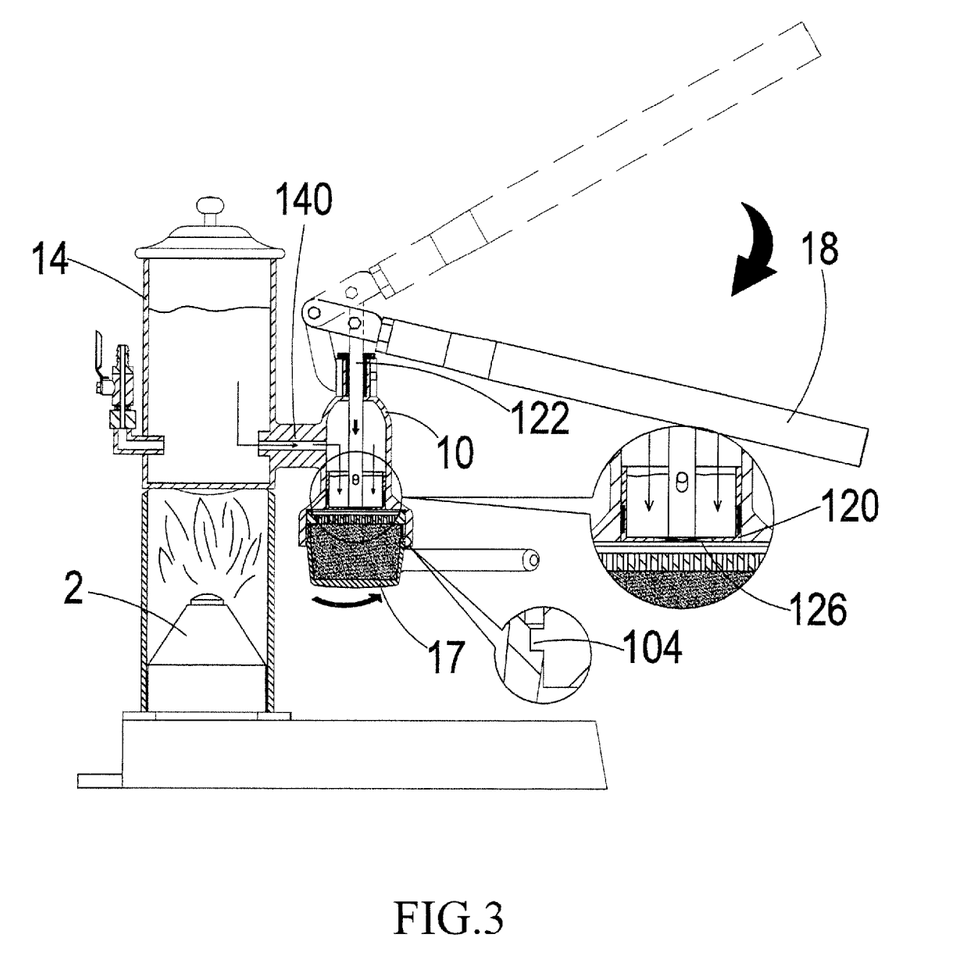
FIG. 3 is a cross-sectional view demonstrating water conveyance according to the present invention.
Figure 4:
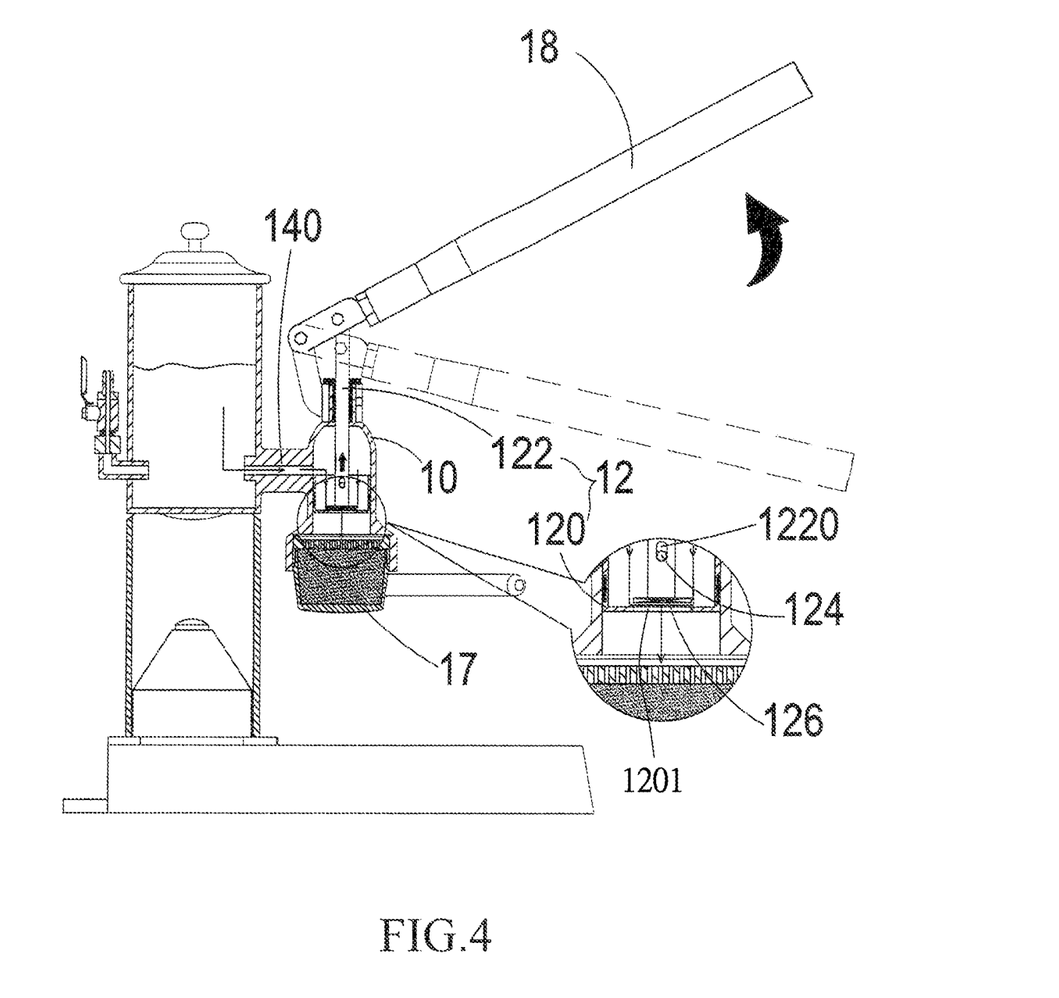
FIG. 4 is a cross-sectional view demonstrating operation of the depression handle to draw in water according to the present invention.
Figure 5:
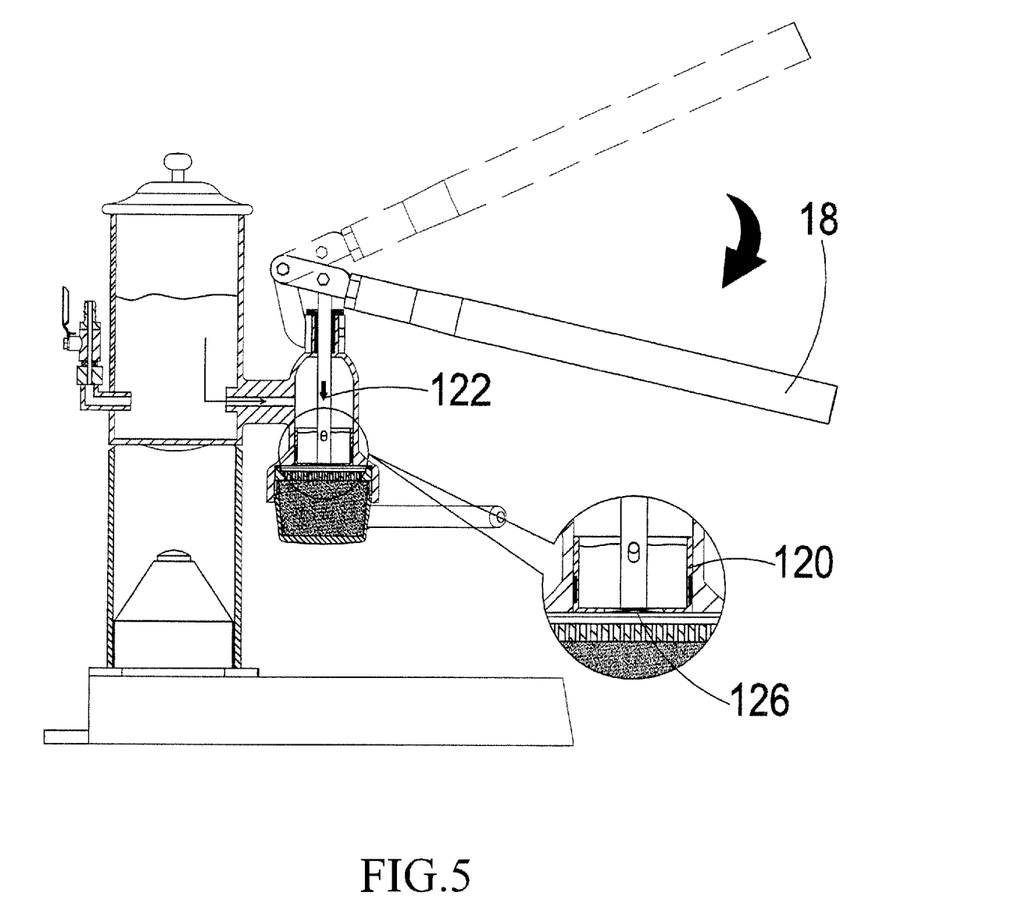
FIG. 5 is another cross-sectional view demonstrating operation of the depression handle to draw in water according to the present invention.

Referring to FIGS. 3, 4, and 5, which are respectively a cross-sectional view demonstrating water conveyance and cross-sectional views demonstrating operation of the depression handle to draw in water, these drawings clearly show that firstly, a user must depress down the depression handle 18 and under this condition, the piston rod 122 that is coupled to the depression handle 18 is forced to move downward, causing downward movement of the piston head 120. Under this condition, the lid 126 and the piston head 120 show a closed configuration. Coffee powders are then filled into carriage container 17, which is then subjected to rotation for being secured to the brewing cylinder 10 by the retention projections 104. Under this condition, since the piston head 120 and the brewing cylinder 10 show a closed configuration at the bottom thereof, water is not allowed to flow into the carriage container 17, and instead staying inside the brewing cylinder 10.

The user may then slowly lift the depression handle 18 upward, and under this condition, the piston rod 122 is raised, and the bar 124 inside the piston head 120 is moved along the pivot hole 1220 of the piston rod 122, thereby making the lid 126 and the piston head 120 showing an open configuration, whereby the water contained in the brewing cylinder 10 is freed to flow through the spacing formed by the detachment of the lid 126 from the piston 12 into the carriage container 17 for making coffee. Through the spacing formed between the lid 126 and the piston head 120, the piston rod 122 can be operated to control the amount of water discharged without causing any reciprocal movement of the piston head 120.

When a desired amount or quantity of water has been discharged for making coffee, the user may lower down the depression handle 18 again, causing the piston rod 122 to descend, thereby causing the lid 126 and the piston head 120 to switch to the closed configuration, which interrupts the supply of water and terminates the process of coffee making or brewing. Further, the water supply device 14 may continuously maintain the quantity of water contained in the brewing cylinder 10.

Figure 6:
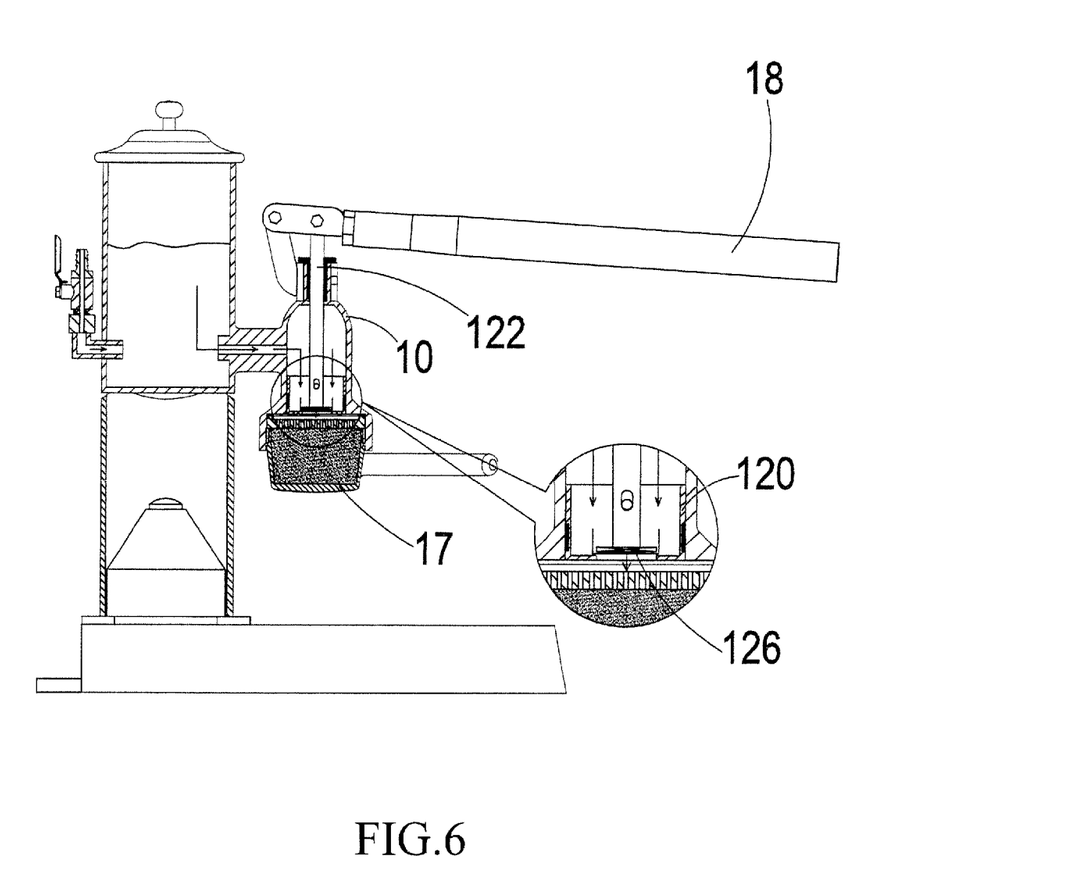
FIG. 6 is a cross-sectional view demonstrating supplement of water into the brewing cylinder according to the present invention.

Referring to FIG. 6, which is a cross-sectional view demonstrating supplement of water into the brewing cylinder, when the brewing cylinder 10 runs out of water, the user may continuously supplement water into the brewing cylinder 10 by simply controlling the positioning of the lid 126 to switch the piston head 120 and the lid 126 between the open configuration and the closed configuration in order to realize control of water discharge, and there is no need for the user to lift up the depression handle 18 for causing the piston rod 122 to move the piston head 120 to a topmost position.

Figure 7:
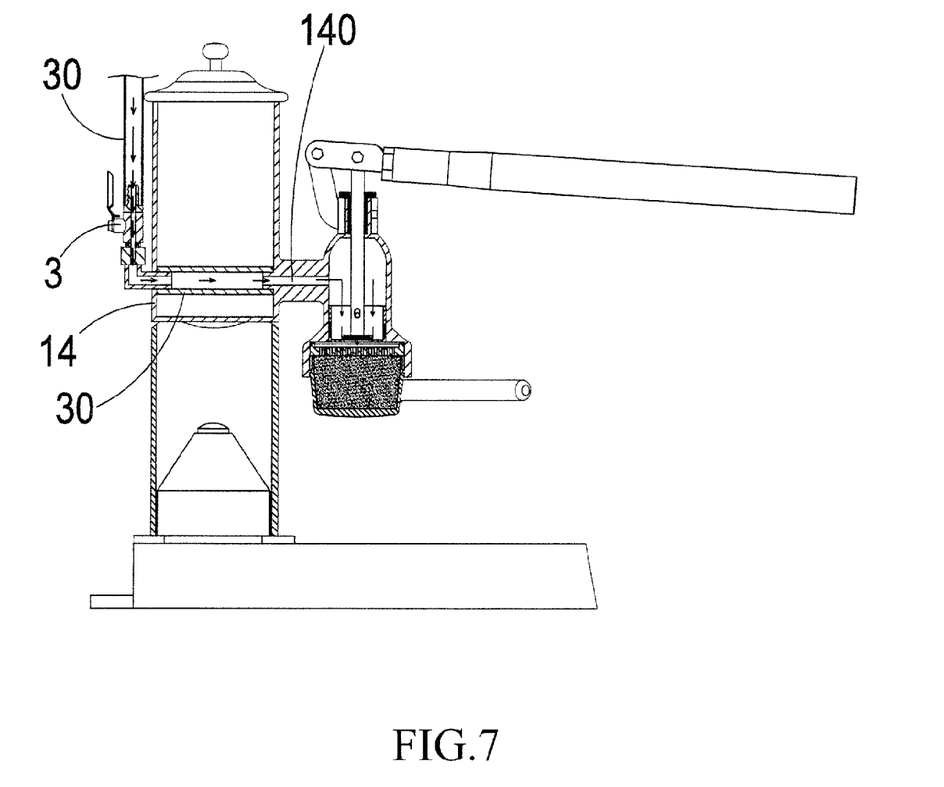
FIG. 7 is a cross-sectional view demonstrating conveyance of water according to the present invention.

Referring to FIG. 7, which is a cross-sectional view demonstrating conveyance of water according to the present invention, the water supply device 14 is additionally provided with a water supply valve 3. When a user attempts to supply water into the device, a water supply tube 30 may be connected to the water supply valve 3 of the water supply device 14, and an additional water supply tube 30 is arranged between the water supply valve 3 and the connection portion 140, whereby continuous supply of water can be made without first filling water into the water supply device. Improved convenience of continuous water supply is realized, wherein the operation of coffee making, water supplying, and control of water discharge is similar to what was discussed above, so that no repeated description is needed here.

Figure 8:
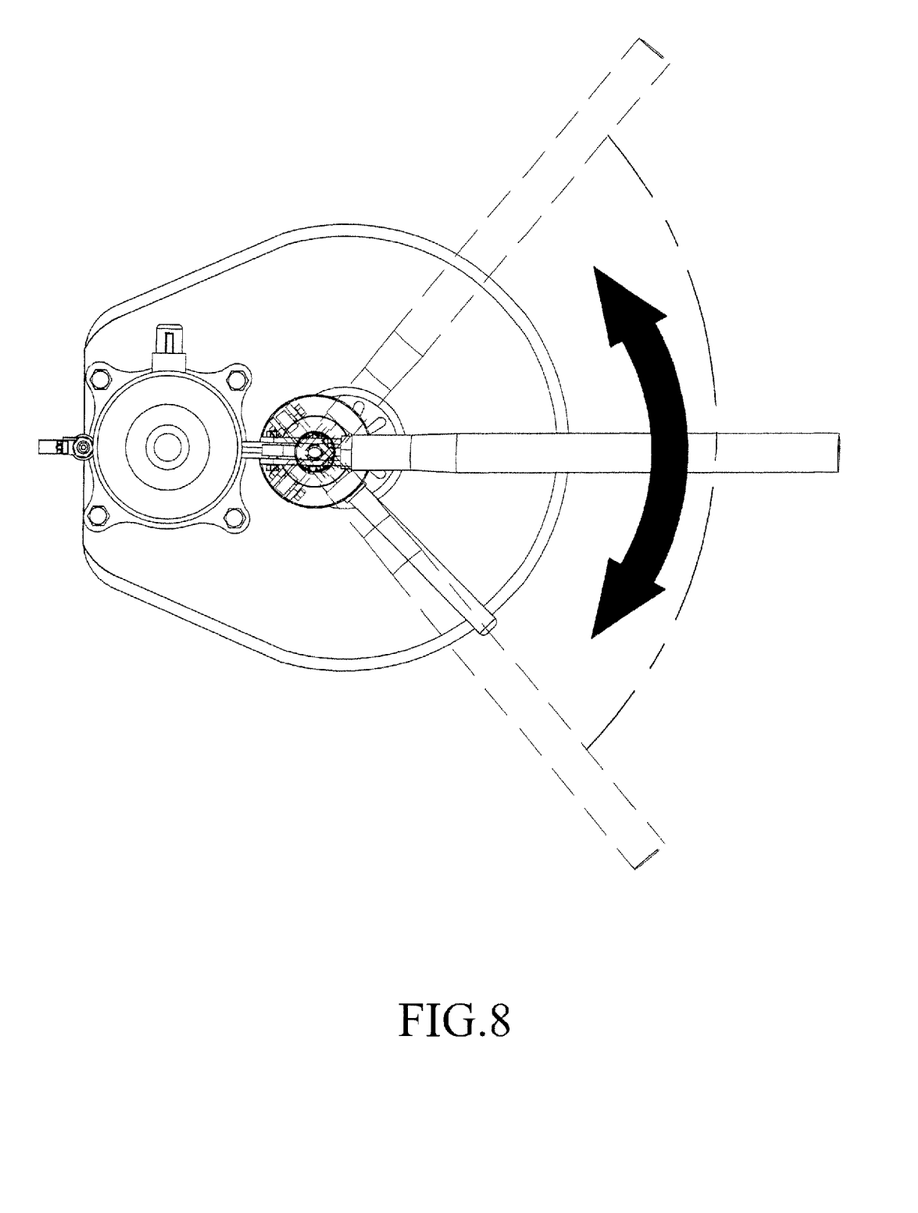
FIG. 8 is a schematic view demonstrating horizontal angular positioning of the depression handle according to the present invention.

Referring to FIG. 8, which is a schematic view demonstrating horizontal angular positioning of the depression handle, the angular positioning of the depression handle 18 allows a user to operate the brewing device 1 ergonomically.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A brewing device comprising a brewing cylinder and a piston, the piston being received in and reciprocally movable inside the brewing cylinder, the brewing device being connected to a water supply device that supplies a liquid to the brewing cylinder, wherein the piston comprises a piston head and a piston rod, the piston head being of a hollow form and comprising a bar mounted to an inside wall of the piston head, the piston rod forming a pivot hole that is rotatably jointed to the bar in such a way to allow the bar to translate with the piston head, the piston rod forming a lid at a location close to the pivot hole that selectively sets the piston in a closed condition, whereby through change of position of the lid relative to the piston head by the movement of the bar, a hole at a bottom of the piston head is opened or closed and the piston is switchably set in an open configuration or a closed configuration for readily controlling amount of water contained in the brewing cylinder to meet various conditions for quantity of brewing water.

2. The brewing device according to claim 1, wherein the brewing cylinder comprises a clamp ring arranged on an inside wall thereof.

3. The brewing device according to claim 2, wherein the piston head comprises a resilient collar that is mounted to an outer wall thereof and in engagement with the clamp ring for preventing spillage of liquid.

4. The brewing device according to claim 1 further comprising a filter device mounted inside the brewing cylinder adapted to prevent reversal movement of coffee powder.

5. The brewing device according to claim 1, wherein the brewing cylinder forms a plurality of retention projections to secure and position a carriage container.

6. The brewing device according to claim 1 further comprising a heating device coupled to the water supply device for heating the water supply device.

7. The brewing device according to claim 6, wherein the heating device forms a plurality of air passages.

8. The brewing device according to claim 1 further comprising a base on which the brewing device is positionable, the base forming a drainage hole that is connected to a water drain pipe.

9. The brewing device according to claim 1, wherein the piston rod is coupled to is a depression handle for causing reciprocal movement of the piston head and for angular positioning 10. The brewing device according to claim 1, wherein the water supply device comprises a connection portion extending therefrom and connected to the brewing cylinder for water conveyance.

* * * * *